United States Patent [19]

Minamida et al.

[11] Patent Number: 4,571,412

[45] Date of Patent: Feb. 18, 1986

[54] AQUEOUS ADHESIVE COMPOSITIONS

[75] Inventors: Hisatsugu Minamida, Yamatokoriyama; Akira Kato, Nara; Isamu Sawayama; Ken-ichi Tanaka, both of Hikami, all of Japan

[73] Assignee: Takeda Chemical Industries, Ltd., Osaka, Japan

[21] Appl. No.: 676,403

[22] Filed: Nov. 29, 1984

[30] Foreign Application Priority Data

Dec. 9, 1983 [JP] Japan ................................. 58-233417

[51] Int. Cl.$^4$ .......................... C08J 1/00; C08J 77/00; C08K 1/00
[52] U.S. Cl. ..................................... 524/64; 524/514; 524/802
[58] Field of Search .......................... 524/64, 802, 514

[56] References Cited

U.S. PATENT DOCUMENTS 4,287,110  9/1981  Takagishi et al. ................... 524/802

Primary Examiner—Herbert S. Cockeram
Attorney, Agent, or Firm—Wenderoth, Lind & Ponack

[57] ABSTRACT

An aqueous adhesive composition which comprises 0.5 to 30 parts by weight, as solids, of an aqueous cationic polyamide polyamine epichlorohydrin resin solution per 100 parts by weight, as solids, of an aqueous, cationic or nonionic polymer dispersion exhibits not only excellent water resistance despite their room-temperature drying properties, when applied to various kinds of substrates but also exceptionally improved storage stability.

The aqueous cationic or nonionic polymer dispersion may be a dispersion of polymerized ethylenically unsaturated monomers.

10 Claims, No Drawings

AQUEOUS ADHESIVE COMPOSITIONS

The present invention relates to aqueous adhesive compositions having excellent water resistance and storage stability.

Adhesives based on aqueous polymer dispersions such as synthetic resin emulsions have been utilized in a wide range of applications as adhesives for construction materials, for example, floorings, tiles and wallpaper because of their advantages over the so-called solvent-type adhesive containing solvents, which advantages include, for instance, lessened problems encountered from a safety and hygiene standpoint such as environmental pollution and no need to use expensive organic solvents.

Synthetic resin emulsions contain hydrophilic substances such as surfactants and protective colloids to retain their emulsion state. These components often deteriorate in performance when emulsion compositions are applied to some finished products as paints or adhesives. Especially when said products are employed in a place where water resistance is required, they greatly reduce the water resistance, eventually bringing about a situation where the products become unserviceable.

In order to overcome such defect, there have been proposed various procedures.

Among those actually employed are, for instance, the methods directed towards improving water resistance by having various functional groups disposed in the resin constituting emulsion particles and increasing the degree of crosslinking through covalent bonds or ionic bonds during the process where a dried film is formed or the method which comprises incorpoporating into the above-mentioned synthetic resin emulsion having functional groups disposed therein the so-called crosslinking agent, such as initial condensed products exemplified by urea-formaldehyde, melamine-formaldehyde and phenol-formaldehyde resins, or polyfunctional epoxy compounds and polyfunctional isocyanate compounds.

Although such methods have improved to a certain degree the defect of adhesive compositions based on synthetic resin emulsions, the resulting compositions generally show inferior storage stability and are deteriorated in qualities over a short period of time.

In addition, such compositions require heating to promote the reaction when used, and this adds to the time and labor and also greatly limits the applications of the compositions.

Therefore, the emergence of aqueous adhesive compositions exhibiting adequate water resistance by drying at room temperature and also good stability during storage has been strongly demanded in the industrial fields concerned.

The present inventors, after intensive investigation with a specific view to fulfilling such demand, have found that by adding a small amount of a cationic polyamide polyamine epichlorohydrin resin and a neutral or acidic inorganic powder into a conventional synthetic-resin emulsion based adhesive which is cationic or nonionic, the above-described defect can at once be eliminated, thus arriving at the present invention.

Thus, the present invention is directed to an aqueous adhesive composition which contains an aqueous cationic or nonionic polymer dispersion and aqueous cationic polyamide polyamine epichlorohydrin solution in the proportion of 0.5 to 30 parts by weight, as solids, in the aqueous solution per 100 parts by weight, as solids, in the dispersion.

The aqueous cationic or nonionic polymer dispersion which is usable in the present invention is a polymer dispersion employable as an adhesive and which is cationic or nonionic. Such a polymer dispersion includes synthetic resin emulsions, synthetic rubber latices or asphalt emulsions.

As the synthetic resin emulsions, for example, there may be mentioned polymethacrylate type emulsions, polyvinyl acetate type emulsions and ethylene-vinyl acetate copolymer type emulsions.

Among the polymethacrylate type emulsions are, for example, polymers or copolymers from methyl acrylate, methyl methacrylate, ethyl acrylate, butyl acrylate, 2-hydroxyethyl acrylate, etc., and use can be concretely made of ULTRASOLE® CMX-33 (produced by Takeda Chemical Industries, Ltd.), VONCOAT® SFC-55 (produced by Dainippon Ink & Chemicals, Inc.), ALONTACK AC-2600 (produced by Toagosei Chemical Industry Co., Ltd.), POLYSOLE® 2386 (produced by Showa High Polymer Co., Ltd.), etc..

As the ethylene-vinyl acetate copolymer emulsions, use can be made, for example, of PANFLEX® OM-5010 (produced by Kuraray Co., Ltd.), SUMIKA-FLEX® 400 (produced by Sumitomo Chemical Co., Ltd.), etc..

As the synthetic rubber latices, for example, there may be mentioned styrene-butadiene rubber (SBR) latices, methyl methacrylate-butadiene rubber (MBR) latices, acrylonitrile-butadiene rubber (NBR) latices and chloroprene latices and use can be specifically made, for instance, of NEOPRENE® 950 (produced by Showa Neoprene Industries, Ltd.).

As the asphalt emulsions, specifically, use can be made for example of CATIOZOL® (produced by Nichireki Chemical Industries, Ltd.).

The aqueous cationic polyamide polyamine epichlorohydrin resin solution which is useful in the present invention is the known aqueous resin solution which can be produced by known production process, for example, in accordance with the Japanese Patent Publication No. 3547/1960 and the Japanese Unexamined Patent Publication No. 110727/1981. Namely, the aqueous cationic polyamide polyamine epichlorohydrin resin solution (hereinafter referred to as "aqueous CPAE resin solution") can be produced by condensing, under heating, an aliphatic dicarboxylic acid, such as adipic acid, sebacic acid, malonic acid, succinic acid and glutaric acid, with a polyalkylene polyamine, such as diethylenetriamine, triethylenetetramine and tetraethylenepentamine, to synthesize a polyamide polyamine, followed by the reaction of said polyamide-polyamine with epichlorohydrin in an aqueous solution, and the resin normally is in the state of an aqueous solution having a resin concentration of 10 to 30 weight percent. There may be specifically mentioned an aqueous resin solution (e.g. INSTAFIT® 101G, produced by Takeda Chemical Industries, Ltd.) produced by condensing under heating adipic acid with diethylenetriamine to give a polyamide polyamine, followed by the reaction with epichlorohydrin in an aqueous solution. Among these aqueous CPAE resin solutions, particularly preferable are those having a pH of not less than 3 and a viscosity of 20 to 300 cps (at 20° C.).

By mixing such aqueous CPAE resin solution with the above-mentioned aqueous cationic or nonionic polymer dispersion, there can be obtained an aqueous adhesive composition containing both of the components. As for the incorporation ratio of the two components, the solid of the aqueous solution should be 0.5 to 30 parts by weight, preferably 2.0 to 25 parts by weight relative to 100 parts by weight of the solid in the dispersion. Not more than 0.5 parts by weight brings about inadequate improvement of water resistance and, not less than 30 parts by weight tends to reduce bonding strength under normal conditions after the practical application.

The compositions of the present invention may have 50 to 400 parts by weight of a neutral or acidic inorganic powder per 100 parts by weight, as solids, of an aqueous, cationic or nonionic polymer dispersion.

The neutral or acidic inorganic powder which is usable in the present invention may be any type of inorganic powder being inert to acid, and includes, for example, clays such as silicate, pyrophilite and halosite, specifically SHOKOZAN CLAY® (produced by Shokozan Clay Industry, Ltd.), ZIEKLITE® (produced by Zieklite Industries, Ltd.); silica such as anhydrous silicic acid, silicon sand and silica powder; and finely powdered pigments such as titanium oxide and iron oxide red. These inorganic powders are added to the above mentioned aqueous polymer dispersion at a ratio of 50 to 400 parts by weight against 100 parts by weight, as solids, in said dispersion. Not more than 50 parts by weight of the powder fail to function fully as an extender to secure and maintain the firm adhesive layer, whereas not less than 400 parts by weight of the powder results in a lack of cohesive force as an adhesive.

The aqueous adhesive compositions containing the inorganic powder can be obtained by compounding such inorganic powder into the above-mentioned mixture of the aqueous polymer dispersion and aqueous CPAE resin solution.

The compositions of the present invention as described in the above may furthermore contain various compounding materials commonly used in the conventional adhesive compositions to such an extent as may not impair the effect of the compositions of the present invention. As these compounding materials, there may be mentioned nonionic thickeners or humidifying agents such as methylcellulose, polyvinyl alcohol and polyethylene glycol; tackifiers such as cumarone-indene resin, terpenephenol resin, xylene-formaldehyde resin, aromatic hydrocarbon resin and aliphatic hydrocarbon resin, other defoaming agents, antiseptic, dispersing agents, plasticiser, freezing stabilizers, etc..

The aqueous adhesive compositions of the present inventions can demonstrate excellent water resistance in spite of their room-temperature drying type, when applied to various kinds of substrates. In addition, the compositions of the present invention possess exceptionally improved storage stability.

The compositions of the present invention, due to their excellent water resistance performance, are particularly useful as adhesives for building materials, for instance, for interior finish work, in places such as the kitchen and bathroom, where water is used.

The composition of the present invention containing the polymer dispersion and aqueous CPAE resin solution normally includes about 90 to 40 weight percent of water, and such composition is suitable for example for the sticking or bonding of wallpaper to mortar concrete, plywood or slate, bonding of plywood with plywood and bonding of lightweight foamed materials to mortar concrete, plywood or slate.

The composition further containing an inorganic powder normally includes about 20 to 50 weight percent of water, and such composition is suitable for example, for the bonding of ceramic tiles to mortar concrete, plywood, slate or metal and of vinyl tiles to mortar concrete.

The examples and reference examples are described in the following to illustrate the present inventions specifically, whereby the term "part" used in the individual examples means part by weight of the solid.

EXAMPLE 1

By mixing 100 parts of a cationic acrylate emulsion (produced by Takeda Chemical Industries, Ltd. of Japan under the trade name ULTRASOL® CMX-33 with a solid content of 45 weight percent) as a synthetic resin emulsion with 5 parts of an aqueous CPAE resin solution (produced by Takeda Chemical Industries, Ltd. of Japan under the trade name of INSTAFIT® 101G with a solid content of 30 weight percent), 200 parts of silica powder (with a particle size of $30\mu$) as an inorganic powder, 0.2 parts of a defoaming agent, (produced by Sunnopco Co., Ltd. under the trade name of NOPCO® 8034), 10 parts of a plasticizen (DBP), 120 parts of an aromatic hydrocarbon resin (produced by Mitsui Petrochemical Industries, Ltd. of Japan, under the trademark PETROSIN #100) and 6 parts of methyl cellulose, an aqueous adhesive composition was obtained. The composition exhibited a solid content of 70 weight percent and a viscosity of 800,000 centipoise at 20° C.

EXAMPLE 2

Using the same components in the same amounts as described in Example 1, except that the aqueous CPAE resin solution was utilized at 25 parts in place of 5 parts of the same as used in Example 1, an aqueous adhesive composition was obtained through mixing.

REFERENCE EXAMPLE 1

The adhesive composition of Example 1 which was prepared without the addition of the aqueous CPAE resin solution was employed as the adhesive composition of Reference Example 1.

REFERENCE EXAMPLE 2

The adhesive composition of Example 1 which was prepared by adding 50 parts of the aqueous CPAE resin solution in place of 5 parts of the same was employed as the adhesive composition of Reference Example 2.

REFERENCE EXAMPLE 3

The adhesive composition of Example 1 which was prepared by adding 200 parts of calcium carbonate in place of 200 parts of silica powder was employed as the adhesive composition of Reference Example 3.

BONDING STRENGTH TEST (1) These adhesive compositions of Examples 1 and 2 and Reference Examples 1 and 2 were applied to concrete boards for sidewalk paving uses as stipulated by JIS A 5304 and waterproof plywood (1st grade in Japanese Agricultural Standard, abbreviated to "JAS") to a thickness of 3 mm, respectively. Part of the adhesive compositions thus applied was scraped off with a scratcher measuring 3 mm wide by 3 mm high, and 20 minutes later, ceramic and porcelain tiles (7.5 cm×7.5 cm in size) for interior finish working were bonded under pressure, followed by allowing them to stand at room temperature for 2 weeks. With the resulting bonded assemblies, the bonding strength under normal conditions and the water-resistant bonding strength after immersion in water for one week were measured by means of the Kenken (Building Research Institute) type of tensile testing machine. The results are shown in Table 1.

(2) Using the adhesive compositions of Examples 1 and 2 and Reference Examples 1 and 2, the test of bonding together boards for ceilings was conducted in accordance with JIS A 1612 "Testing methods for bonding strength of ceiling boards adhesives". The results are shown in Table 2.

(3) The adhesive composition of Example 1 and Reference Example 1 were placed in a heating cabinet thermostat-controlled at 50° C., and the storage-stability accelerated test was carried out. The results are shown in Table 3.

REFERENCE EXAMPLE 4

The adhesive composition of Example 3 was prepared without adding the aqueous CPAE resin solution was employed to form the adhesive composition of Reference Example 4.

Subsequently, using the adhesive compositions of Example 3 and Reference Example 4, the test of bonding together vinyl asbestos tiles was carried out in accordance with JIS A 5536 "Adhesive for PVC floor tiles". The results are shown in Table 4.

TABLE 4

| Bonding strength for vinyl asbestos tiles. | | |
|---|---|---|
| Tested item | Example 3 | Reference Example 4 |
| Normal conditions | 8.2 | 7.7 |
| Water-resistance | 4.8 | 0.2 |

Normal conditions: conditioned at standard conditions for 72 hours
Water-resistant: immersed in water at 20 ± 2° C. for 3 days after being conditioned at standard conditions for 72 hours

TABLE 1

| | | Bonding strength toward ceramic and porcelain tiles. | | | | |
|---|---|---|---|---|---|---|
| Substrate | Tile | Tested Item | Example 1 | Example 2 | Reference Example 1 | Reference Example 2 |
| Concreate Board for Sidewalk Paving | Ceramic | Normal conditions | 17.2 | 16.5 | 14.9 | 9.0 |
| | | Water-resistant | 8.5 | 7.9 | 0.6 | 3.2 |
| | Porcelain | Water-resistant | 7.5 | 7.0 | 0 | 2.0 |
| Waterproof Plywood | Ceramic | Normal conditions | 11.2 | 10.6 | 10.5 | 6.5 |
| | | Water-resistant | 5.3 | 5.1 | 0 | 2.0 |
| | Porcelain | Normal conditions | 10.0 | 9.8 | 9.2 | 5.8 |
| | | Water-resistant | 5.0 | 4.9 | 0 | 1.5 |

(Unit: Kg/cm$^2$)

Normal conditions: conditioned at standard conditions for 2 weeks.
Water-resistant: immersed in water of 20 ± 2° C. for 1 week after being conditioned at standard conditions for 2 weeks.
Open time: 20 minutes

TABLE 2

| | | Bonding strength for boards for ceilings. | | | | |
|---|---|---|---|---|---|---|
| Substrate | Board for Ceiling | Tested Item | Example 1 | Example 2 | Reference Example 1 | Reference Example 2 |
| Asbestos slate | Flexible fiberboard | Normal conditions | 6.0 | 6.2 | 5.8 | 5.2 |
| | | Water-resistant | 3.3 | 3.0 | 0.2 | 0 |
| Waterproof Plywood | Asbestos cement calcium silicate board | Normal conditions | 8.2 | 8.4 | 7.9 | 6.0 |
| | | Water-resistant | 4.3 | 4.0 | 0.3 | 0 |

(Unit: kg/cm$^2$)

Normal conditions: conditioned at standard conditions for 72 hours.
Water-resistant: immersed in water of 20 ± 2° C. for 24 hours after being conditioned at standard conditions for 72 hours.
Open time: 5 minutes Open time: 20 minutes

TABLE 3

| Storage stability (at 50° C.) | | |
|---|---|---|
| Time elapsed | Example 1 | Reference Example 3 |
| 7 days | No change | gelled |
| 2 months | No change | — |

(Unit: kg/cm$^2$)

EXAMPLE 4

Using the same components in the same amounts as described in Example 1 except that 100 parts of a non-ionic polyethylenevinyl acetate copolymer emulsion (produced by Kuraray Co., Ltd. of Japan, under the tradename PANFLEX® OM5010) was utilized in place of the synthetic resin emulsion in Example 1, there was obtained an aqueous adhesive composition.

EXAMPLE 5

Using the same components at the same formulating ratio as described in Example 1 except that 100 parts of a cationic polyacrylate emulsion (produced by Dainippon Ink & Chemicals, Inc. of Japan, under the tradename VONCOAT ® SFC-55) was utilized in place of the synthetic resin emulsion in Example 1, there was obtained an aqueous adhesive composition.

The composition of Example 5 and the composition of Example 4 were applied to concrete boards for sidewalk paving as stipulated by JIS A 5304 and waterproof plywood (1st grade in JAS) to a thickness of 3 mm, respectively. Part of the adhesive compositions thus applied was scraped off with a scratcher measuring 3 mm wide by 3 mm high, and 20 minutes later, ceramic and porcelain tiles (7.5 cm × 7.5 cm in size) for interior finish working were bonded under pressure. With the resulting bonded assemblies, the bonding strength at normal conditions after allowing them to stand at normal temperature for 2 weeks and the water-resistant bonding strength after furthermore immersing them into water for 1 week were measured by means of a Kenken (Building Research Institute) type of a tensile testing machine. The results are shown in Table 5.

TABLE 5

| Bonding strength toward ceramic and porcelain tiles. | | | | |
|---|---|---|---|---|
| Substrate | Tile | Tested item | Example 4 | Example 5 |
| Concrete board for sidewalk paving | Ceramic | Normal conditions | 16.8 | 16.1 |
|  |  | Water-resistant | 7.5 | 8.1 |
|  | Porcelain | Normal conditions | 14.2 | 13.0 |
|  |  | Water-resistant | 6.0 | 6.5 |
| Waterproof Plywood | Ceramic | Normal conditions | 10.5 | 11.2 |
|  |  | Water-resistant | 5.0 | 4.5 |
|  | Porcelain | Normal conditions | 9.8 | 10.3 |
|  |  | Water-resistant | 4.7 | 4.3 |
| (Unit: kg/cm$^2$) | | | | |

EXAMPLE 6

By mixing 100 parts of a cationic polyacrylate emulsion (ULTRASOLE ® CMX-33, produced by Takeda Chemical Industries, Ltd.) as an aqueous synthetic resin dispersion with 5 parts of an aqueous CPAE resin solution (INSTAFIT ® 101G, produced by Takeda Chemical Industries, Ltd.), 0.2 parts of a defoaming agent and 1 part of methylcellulose, there was obtained an aqueous adhesive composition (with a solid content of 47 weight percent and a viscosity of 5000 cps at 20° C.).

EXAMPLE 7

An aqueous adhesive composition was obtained by formulating the same components in the same amounts as described in Example 6 except that 100 parts of a nonionic polyethylenevinyl acetate copolymer emulsion (PANFLEX ® OM-5010, produced by Kuraray, Co., Ltd.) in place of 100 parts by the cationic polyacrylate emulsion in Example 6.

REFERENCE EXAMPLE 6

The composition as described in Example 7 was prepared but without adding the aqueous CPAE resin solution to produce an aqueous composition.

Using the adhesive compositions as given in the above Examples 6 and 7 and Reference Examples 5 and 6, plywood and particle board were bonded. The bonding conditions were as described below.

Substrates:
Waterproof plywood (JAS 1st grade, 20 × 50 × 10 mm) and
Particle board (JIS A 5908, 20 × 50 × 10 mm)
Application rate of adhesive: 300 g/m$^2$ (applied to plywood)
Bonding surface area: 20 × 20 mm$^2$
Bonding pressure and time: 1 kg × 10 min.
Aging:
Normal conditions: for 72 hours at standard conditions
Water-resistant: for 72 hours at standard conditions and then immersion in water of 20° ± 2° C. for 24 hours With the test pieces prepared by the above procedure, bonding strength (tensile shear strength) was measured by use of a tensile testing machine (Strong ® 37R produced by Toyo Seiki Seisakusho). The results are shown in the following Table.

TABLE 6

| | | Tensile shear strength. | | | |
|---|---|---|---|---|---|
| | | Adhesive | | | |
| Tested items | | Example 6 | Example 7 | Reference Example 5 | Reference Example 6 |
| Tensile shear strength [kg/cm$^2$] | Normal conditions | 22.5 | 18.0 | 21.0 | 17.5 |
|  | Water-resistant | 15.0 | 13.8 | 4.1 | 2.0 |

EXAMPLE 8

By mixing 100 parts of a nonionic MBR synthetic rubber latex (produced by Takeda Chemical Industries Co., Ltd. and the tradename of CROSLENE ® 2M-36 with a solid content of 48 weight percent), 10 parts of an aqueous CPAE resin solution (INSTAFIT ® 101G with a solid content of 30 weight percent), 180 parts of silica powder with a particle size of 30μ), 0.2 parts of defoaming agent (NOPCO ® 8304), 10 parts of plasticizer (DBP), 150 parts of an aromatic hydrocarbon resin (PETROSIN ® #100) and 1 part of methyl cellulose, an aqueous adhesive composition was obtained.

The adhesive composition exhibited a solid content of 71 weight percent and viscosity of 500,000 centipoise at 20° C.

Using the adhesive composition obtained above, the bonding test was carried out according to the method of "BONDING STRENGTH TEST (1)". The results are shown in Table 7.

EXAMPLE 9

50 parts of a cationic asphalt emulsion (produced by Nichireki Chemical Industry Co., Ltd. under the tradename of CATIOSOL ® CPE-4) and 50 parts of ULTRASOL ® CMX-33 with a solid content of 45 weight percent were mixed to prepare an emulsion.

Using the same components in the same amounts as described in Example 1, except that 100 parts of the asphalt emulsion obtained above was used in place of 100 parts of the synthetic resin emulsion, an aqueous adhesive composition was obtained.

The results of "BONDING STRENGTH TEST (1)" with the adhesive composition are shown in Table 7.

TABLE 7

| Bonding strength toward ceramic and porcelain tiles. | | | | |
|---|---|---|---|---|
| Substrate | Tile | Tested Item | Example 8 | Example 9 |
| Concrete Board for Sidewalk Paving | Ceramic | Normal conditions | 18.8 | 14.3 |
| | | Water-resistant | 7.3 | 8.2 |
| Asbestos Slate | Ceramic | Normal conditions | 20.5 | 15.1 |
| | | Water-resistant | 8.6 | 6.7 |
| | | | (Unit: $Kg/cm^2$) | |

Normal conditions: conditioned at standard conditions for 2 weeks
Water-resistant: immersed in water of 20 ± 2° C. for 1 week after being conditioned at standard conditions for 2 weeks
Open time : 20 minutes

What is claimed is:

1. An aqueous adhesive composition which comprises 0.5 to 30 parts by weight, as solids, of an aqueous, cationic polyamide polyamine epichlorohydrin resin solution per 100 parts by weight, as solids, of an aqueous, cationic or nonionic polymer dispersion.

2. The composition according to claim 1, wherein the cationic or nonionic polymer dispersion is a synthetic resin emulsion.

3. The composition according to claim 1, wherein the cationic or nonionic polymer dispersion is a synthetic rubber latex.

4. The composition according to claim 1, wherein the cationic or nonionic polymer dispersion is an asphalt emulsion.

5. The composition according to claim 1, wherein the cationic polyamide polyamine epichlorohydrin resin solution is one having a pH value of not less than 3 and a viscosity of 20 to 300 cps at 20° C.

6. The composition according to claim 1, wherein the composition further contains 50 to 400 parts by weight of a neutral or acidic inorganic powder per 100 parts by weight, as solids, of an aqueous, cationic or nonionic polymer dispersion.

7. The composition according to claim 1, wherein the cationic polyamide polyamine epichlorohydrin resin is produced by condensing an aliphatic dicarboxylic acid with a polyalkylene polyamine to produce a polyamide polyamine and reacting said polyamide polyamine with epichlorohydrin.

8. The composition according to claim 7, wherein the aliphatic dicarboxylic acid is adipic acid.

9. The composition according to claim 7, wherein the polyalkylene polyamine is diethylene triamine.

10. The composition according to claim 7, wherein the aliphatic dicarboxylic acid is adipic acid and the polyalkylene polyamine is diethylene triamine.

* * * * *